(12) United States Patent
Utsunomiya et al.

(10) Patent No.: US 12,401,274 B2
(45) Date of Patent: Aug. 26, 2025

(54) ELECTRONIC DEVICE INCLUDING BOOST CIRCUIT

(71) Applicant: ABLIC Inc., Tokyo (JP)

(72) Inventors: Fumiyasu Utsunomiya, Tokyo (JP); Takakuni Douseki, Kusatsu (JP); Ami Tanaka, Kusatsu (JP)

(73) Assignee: Ablic Inc., Nagano (JP)

( * ) Notice: Subject to any disclaimer, the term of this patent is extended or adjusted under 35 U.S.C. 154(b) by 214 days.

(21) Appl. No.: 17/695,003

(22) Filed: Mar. 15, 2022

(65) Prior Publication Data

US 2022/0302829 A1    Sep. 22, 2022

(30) Foreign Application Priority Data

Mar. 16, 2021 (JP) ................... 2021-041967

(51) Int. Cl.
    *H02M 3/07* (2006.01)
    *H02M 3/158* (2006.01)

(52) U.S. Cl.
    CPC ............. *H02M 3/07* (2013.01); *H02M 3/158* (2013.01)

(58) Field of Classification Search
    CPC ............ H02M 3/00; H02M 3/02; H02M 3/04; H02M 3/06; H02M 3/07; H02M 3/073–078; H02M 3/10; H02M 3/135; H02M 3/137; H02M 3/142; H02M 3/155; H02M 3/1552; H02M 3/156; H02M 3/1563; H02M 3/158; H02M 3/1582; H02M 3/1584; H02M 3/1588; H02M 1/0006; H02M 1/0041; H02M 1/0045; H02M 1/0067; H02M 1/007; H02M 1/0096; H02M 1/08; H02M 1/088; H02M 1/36

USPC ........ 323/222–226, 266, 268–275, 282–285, 323/288, 299–303, 351; 363/59, 60, 65, 363/74, 123, 124; 320/116–123, 124, 320/139, 140, 166, 167

See application file for complete search history.

(56) References Cited

U.S. PATENT DOCUMENTS

| | | | | |
|---|---|---|---|---|
| 8,233,297 B2 * | 7/2012 | Kim | ..................... | H05B 45/38 363/71 |
| 10,075,068 B2 * | 9/2018 | Utsunomiya | ........... | H02M 1/08 |
| 2005/0265052 A1 * | 12/2005 | Utsunomiya | ......... | H02M 3/073 363/60 |
| 2007/0279950 A1 * | 12/2007 | Sugiyama | ............... | H02M 3/07 363/59 |

(Continued)

FOREIGN PATENT DOCUMENTS

| | | |
|---|---|---|
| JP | 2018-085888 A | 5/2018 |
| KR | 101890169 B1 | 8/2018 |

OTHER PUBLICATIONS

Japanese language Office Action issued in Japanese Application No. 2021-041967 dated Mar. 3, 2025 with English translation (6 pages).

*Primary Examiner* — Thienvu V Tran
*Assistant Examiner* — Carlos O Rivera-Perez
(74) *Attorney, Agent, or Firm* — Crowell & Moring LLP (57) ABSTRACT

An electronic device including a boost circuit includes a first boost circuit, a first output circuit, a load, a first storage capacitor, a second storage capacitor, and an input terminal, wherein the input terminal is connected to the first storage capacitor and the first boost circuit, the second storage capacitor is connected to the first boost circuit and the first output circuit, and the load is connected to the first output circuit.

16 Claims, 3 Drawing Sheets

(56) References Cited

U.S. PATENT DOCUMENTS

| | | | |
|---|---|---|---|
| 2010/0327765 A1* | 12/2010 | Melanson | H02M 3/3374 363/16 |
| 2015/0256062 A1* | 9/2015 | Shirahata | H02M 1/36 323/304 |
| 2018/0152100 A1 | 5/2018 | Utsunomiya et al. | |
| 2018/0367034 A1* | 12/2018 | Utsunomiya | H02J 1/00 |

* cited by examiner

ELECTRONIC DEVICE INCLUDING BOOST CIRCUIT

RELATED APPLICATIONS

This application claims priority to Japanese Patent Application No. 2021-041967, filed on Mar. 16, 2021, the entire content of which is incorporated herein by reference.

BACKGROUND OF THE INVENTION

1. Field of the Invention

The present invention relates to an electronic device including a boost circuit.

2. Description of the Related Art

In a case where input power is converted to boosted power by a boost circuit and the boosted power is used to operate a load, the load cannot be operated by the input power unless the input power is equal to or greater than self-consumed power of the boost circuit Thus, in an electronic device that includes a conventional boost circuit, a configuration has been proposed in which a storage capacitor is provided at an input of the boost circuit, power required to operate the load for a predetermined period of time is stored in the storage capacitor, and the load is intermittently operated by the power stored in the storage capacitor (for example, Japanese Patent Application Laid-open No. 2018-085888).

SUMMARY OF THE INVENTION

An aspect of the present invention provides an electronic device including a boost circuit including a small number of storage capacitors or a boost circuit that uses a small storage capacitor having a small capacitance value.

An electronic device including a boost circuit includes a boost circuit, an output circuit, a load, a first storage capacitor, a second storage capacitor, and an input terminal. The input terminal is connected to the first storage capacitor and the first boost circuit, the second storage capacitor is connected to the first boost circuit and the output circuit, and the load is connected to the output circuit.

Since the second storage capacitor stores the boosted power boosted by the first boost circuit, even a small storage capacitor having a small capacitance value can store power for operating a load for a certain period of time. Since the first boost circuit can be operated a plurality of times to store the power of the first storage capacitor in the second storage capacitor, the first storage capacitor may also be a small storage capacitor having a capacitance value smaller than that of a storage capacitor having a conventional configuration.

DETAILED DESCRIPTION OF THE PREFERRED EMBODIMENTS

First Embodiment

Figure 1:
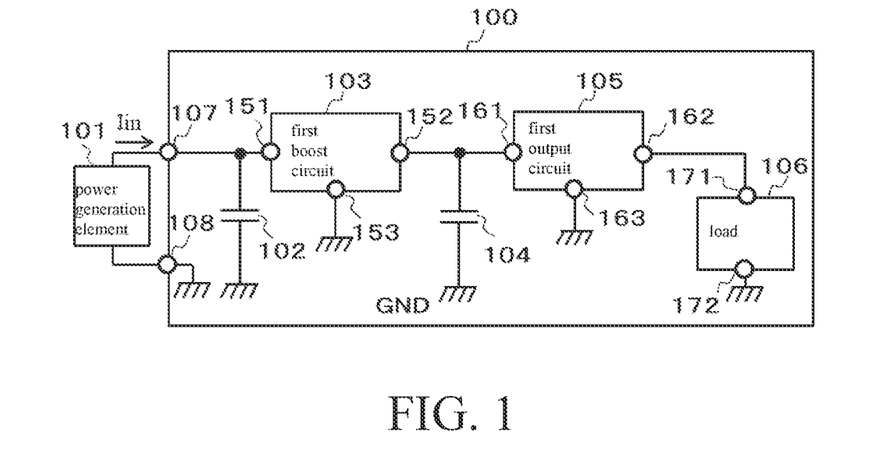
FIG. 1 is a circuit diagram illustrating an example of a first embodiment of the present invention.

A first embodiment of the present invention will be described below with reference to the drawings. FIG. 1 is a circuit diagram illustrating an example of an electronic device 100 including a boost circuit according to the present embodiment.

The electronic device 100 including the boost circuit according to the first embodiment of the present invention includes a first boost circuit 103, a first output circuit 105, a first storage capacitor 102, a second storage capacitor 104, a load 106, a first input terminal 107, and a second input terminal 108.

Connection of the electronic device 100 including the boost circuit will be described. An external power generation element 101 is externally connected between the first input terminal 107 and the second input terminal 108. The first input terminal 107 is connected to a first terminal of the first storage capacitor 102 and a first terminal 151 of the first boost circuit 103. The second input terminal 108 and a second terminal of the first storage capacitor 102 are connected to a GND power supply. A second terminal 152 of the first boost circuit 103 is connected to a first terminal of the second storage capacitor 104 and a first terminal 161 of the first output circuit 105. A third terminal 153 of the first boost circuit 103 and a second terminal of the second storage capacitor 104 are connected to the GND power supply. A second terminal 162 of the first output circuit 105 is connected to a first terminal 171 of the load 106. A third terminal 163 of the first output circuit 105 and a second terminal 172 of the load 106 are connected to the GND power supply.

An operation of the electronic device 100 including the boost circuit of the first embodiment will be described. In response to the power generation element 101 outputting a first generated power, the first generated power is stored in the first storage capacitor 102. In response to a stored voltage of the first storage capacitor 102 reaching an activation voltage of the first boost circuit 103, the first boost circuit 103 is activated by stored power of the first storage capacitor 102, and starts a boosting operation. In response to the first boost circuit 103 starting the boosting operation, the first boost circuit 103 converts the stored power of the first storage capacitor 102 to a first boosted power. The first boosted power is stored in the second storage capacitor 104. In response to the stored voltage of the first storage capacitor 102 falling below an operating voltage of the first boost circuit 103, the first boost circuit 103 stops the boosting operation. The generated power from the power generation element 101 is converted to the stored voltage of the first storage capacitor 102 again, and the same operation is repeated. In response to the stored voltage of the second storage capacitor 104 reaching an activation voltage of the first output circuit 105, the first output circuit 105 converts a stored power of the second storage capacitor 104 to an output power. The output power is supplied to the load 106, and the load 106 is operated by the output power.

Here, for example, in a case where a capacitance value of the first storage capacitor 102 is 0.68 mF, a capacitance value of the second storage capacitor 104 is also 0.68 mF, an activation voltage of the first boost circuit 103 is 0.3 V, and an activation voltage of the first output circuit 105 is 1.9 V, in response to conversion of the stored power in the first storage capacitor 102 to the first boosted power being repeated approximately 100 times, the stored voltage of the second storage capacitor 104 reaches the activation voltage of the first output circuit 105. The first output circuit 105 generates output power from the stored voltage of the second storage capacitor 104 and supplies the output power to the load 106.

As described above, the stored power of the first storage capacitor 102 is used as an activation power of the first boost circuit 103. Thus, even in a case where the generated power of the power generation element 101 is smaller than the activation power of the first boost circuit 103, the first boost circuit 103 can convert the stored power of the first storage capacitor 102 to the first boosted power. The stored power of the first storage capacitor 102 is smaller than a power for operating the load 106 for a predetermined period of time. However, the power for operating the load 106 for the predetermined period of time can be stored in the second storage capacitor 104 by activating the first boost circuit 103 a plurality of times. Further, the stored voltage of the second storage capacitor 104 is higher than the stored voltage of the first storage capacitor 102. Thus, even in a case where the capacitance value of the second storage capacitor 104 is not increased, the stored power of the second storage capacitor 104 can operate the load 106 for the predetermined period of time.

Figure 2:
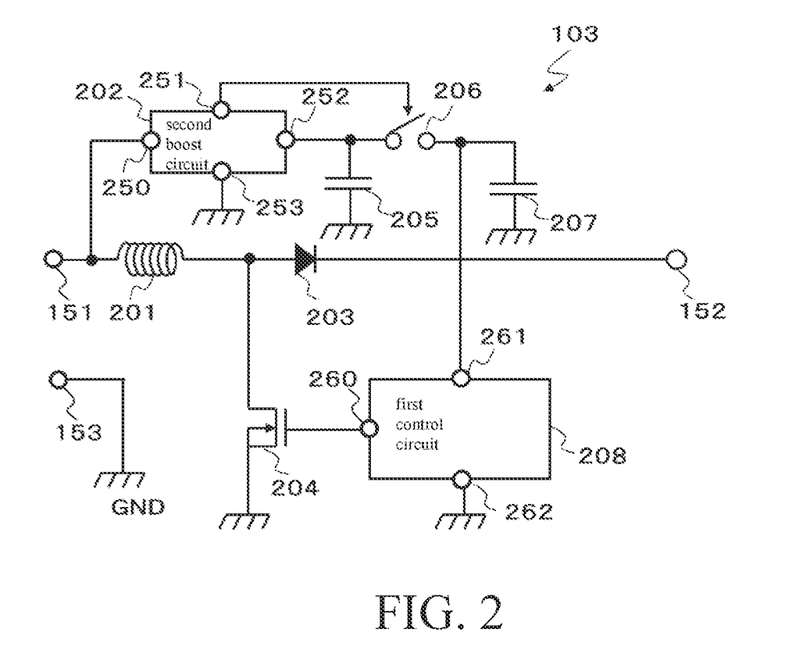
FIG. 2 is a circuit diagram illustrating an example of a first boost circuit of the first embodiment of the present invention.

FIG. 2 illustrates an example of the first boost circuit 103. The first boost circuit 103 includes a second boost circuit 202, a first control circuit 208, a third storage capacitor 205, a fourth storage capacitor 207, a first coil 201, a first diode 203, a first N-channel MOS transistor (hereinafter described as an "NMOS transistor") 204, a first switch 206, the first terminal 151, the second terminal 152, and the third terminal 153.

Connection of the first boost circuit 103 will be described. The first terminal 151 of the first boost circuit 103 is connected to a first terminal of the first coil 201 and a first terminal 250 of the second boost circuit 202. A second terminal 251 of the second boost circuit 202 is connected to a control terminal of the first switch 206. A third terminal 252 of the second boost circuit 202 is connected to a first terminal of the first switch 206 and a first terminal of the third storage capacitor 205. A fourth terminal 253 of the second boost circuit 202 and a second terminal of the third storage capacitor 205 are connected to the GND power supply. A second terminal of the first switch 206 is connected to a first terminal of the fourth storage capacitor 207 and a second terminal 261 of the first control circuit 208. A third terminal 262 of the first control circuit 208 and a second terminal of the fourth storage capacitor 207 are connected to the GND power supply. A drain terminal of the first NMOS transistor 204 is connected to a second terminal of the first coil 201 and an anode terminal of the first diode 203. A gate terminal of the first NMOS transistor 204 is connected to a first terminal 260 of the first control circuit 208. A source terminal of the first NMOS transistor 204 is connected to the GND power supply. A cathode terminal of the first diode 203 is connected to the second terminal 152 of the first boost circuit 103. The third terminal 153 of the first boost circuit 103 is connected to the GND power supply.

An operation of the first boost circuit 103 will be described. In response to a voltage of the first terminal 151 of the first boost circuit 103 reaching an activation voltage of the second boost circuit 202, the second boost circuit 202 starts a boosting operation. In response to the second boost circuit 202 starting the boosting operation, the power supplied to the first terminal 151 of the first boost circuit 103 is converted to a second boosted power. The second boosted power is stored in the third storage capacitor 205. The second boost circuit 202 monitors the stored voltage of the third storage capacitor 205 and detects that the stored power of the third storage capacitor 205 has been stored long enough for the first control circuit 208 to operate for a predetermined period of time. In response to the second boost circuit 202 detecting that the stored voltage of the third storage capacitor 205 has reached a predetermined voltage or greater, the second boost circuit 202 turns on the first switch 206 to supply the stored power of the third storage capacitor 205 to the second terminal 261 of the first control circuit 208. The first control circuit 208 is operated by the stored power of the third storage capacitor 205. From the first terminal 260, the first control circuit 208 outputs a control signal for repeatedly turning on and off the first NMOS transistor 204. The power stored in the first coil 201 while the first NMOS transistor 204 is on is output to the second terminal 152 of the first boost circuit 103 via the first diode 203 while the first NMOS transistor 204 is off, and thus the first boosted voltage is output from the second terminal 152 of the first boost circuit 103.

For example, in a case where a capacitance value of the third storage capacitor 205 is 1 µF, a capacitance value of the fourth storage capacitor 207 is 0.1 µF, and a stored voltage of the third storage capacitor 205 for turning on the first switch 206 is 2.4 V, the first control circuit 208 operates for approximately 0.1 seconds. Note that the fourth storage capacitor 207 is a smoothing capacitor for the power supply of the first control circuit 208.

As described above, the first control circuit 208 of the first boost circuit 103 operates for the predetermined period of time by using the stored power of the third storage capacitor 205. Thus, the first boost circuit 103 can convert the power input to the first terminal 151 of the first boost circuit 103 to the first boosted power for the predetermined period of time and output the first boosted power from the second terminal 152 of the first boost circuit 103 for the predetermined period of time.

Figure 3:
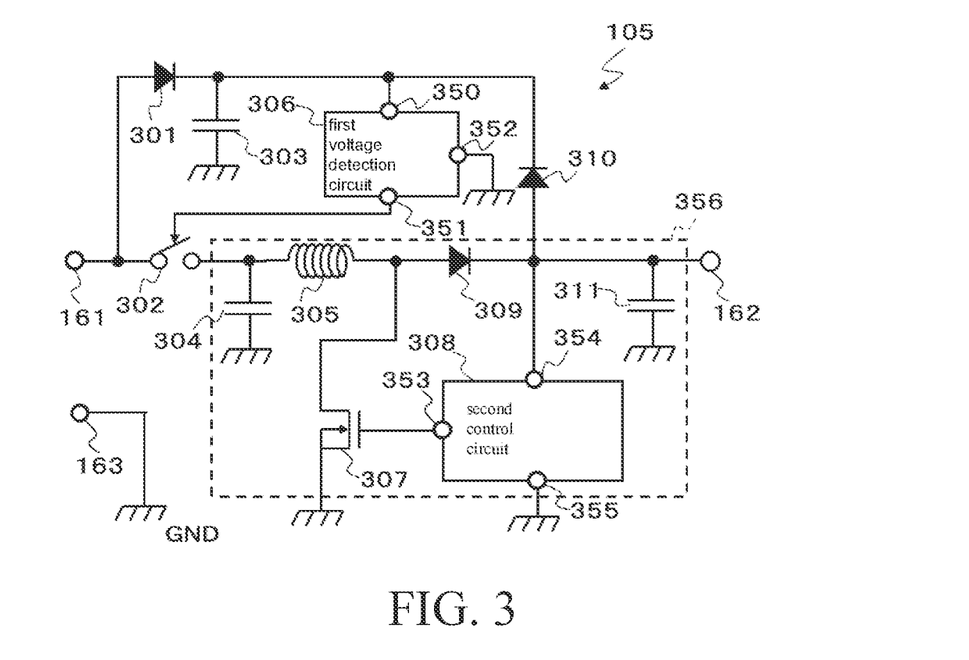
FIG. 3 is a circuit diagram illustrating an example of a first output circuit of the first embodiment of the present invention.

FIG. 3 illustrates an example of the first output circuit 105. The first output circuit 105 includes a first voltage detection circuit 306, a second control circuit 308, a second diode 301, a third diode 309, a fourth diode 310, a fifth storage capacitor 303, a sixth storage capacitor 304, a seventh storage capacitor 311, a second NMOS transistor 307, a second switch 302, a second coil 305, the first terminal 161, the second terminal 162, and the third terminal 163. Here, the second control circuit 308, the third diode 309, the sixth storage capacitor 304, the seventh storage capacitor 311, the second NMOS transistor 307, and the second coil 305 constitute a third boost circuit 356.

Connection of the first output circuit 105 will be described. The first terminal 161 of the first output circuit 105 is connected to an anode terminal of the second diode 301 and a first terminal of the second switch 302. A cathode terminal of the second diode 301 is connected to a first terminal of the fifth storage capacitor 303, a first terminal 350 of the first voltage detection circuit 306, and a cathode terminal of the fourth diode 310. A second terminal 351 of the first voltage detection circuit 306 is connected to a control terminal of the second switch 302. A third terminal 352 of the first voltage detection circuit 306 and a second terminal of the fifth storage capacitor 303 are connected to the GND power supply. A second terminal of the second switch 302 is connected to a first terminal of the sixth storage capacitor 304 and a first terminal of the second coil 305. A second terminal of the second coil 305 is connected to an anode terminal of the third diode 309 and a drain terminal of the second NMOS transistor 307. A gate terminal of the second NMOS transistor 307 is connected to a first terminal 353 of the second control circuit 308. A cathode terminal of the third diode 309 is connected to an anode terminal of the fourth diode 310, a second terminal 354 of the second control circuit 308, a first terminal of the seventh storage capacitor 311, and the second terminal 162 of the first output circuit 105. The third terminal 163 of the first output circuit 105, a source terminal of the second NMOS transistor 307, a third terminal 355 of the second control circuit 308, a second terminal of the sixth storage capacitor 304, and a second terminal of the seventh storage capacitor 311 are connected to the GND power supply.

Operation of the first output circuit 105 illustrated in FIG. 3 will be described.

The power supplied to the first terminal 161 of the first output circuit 105 is stored in the fifth storage capacitor 303 via the second diode 301. The stored voltage of the fifth storage capacitor 303 is monitored by the first voltage detection circuit 306. In response to the first voltage detection circuit 306 detecting that the stored voltage of the fifth storage capacitor 303 has reached a predetermined voltage, the first voltage detection circuit 306 turns on the second switch 302. In response to the second switch 302 being turned on, the power supplied to the first terminal 161 of the first output circuit 105 is supplied to the second terminal 354 of the second control circuit 308 via the second coil 305 and the third diode 309. The second control circuit 308 starts operating by using the power supplied to the second terminal 354. From the first terminal 353, the second control circuit 308 outputs a control signal for repeatedly turning on and off the second NMOS transistor 307. The power stored in the second coil 305 while the second NMOS transistor 307 is on is output to the second terminal 162 of the first output circuit 105 via the third diode 309 while the second NMOS transistor 307 is off, and thus output power is output from the second terminal 162 of the first output circuit 105. The output power is stored in the fifth storage capacitor 303 via the fourth diode 310, while maintaining the operation of the second control circuit 308.

For example, in a case where a capacitance value of the fifth storage capacitor 303 is 10 µF, a detection voltage of the first voltage detection circuit 306 is 1.8 V, and a detection cancel voltage is 1.5 V, in response to a voltage of approximately 1.9 V being input to the first terminal 161 of the first output circuit 105, the second switch 302 is turned on, and this activates the third boost circuit 356. In response to the third boost circuit being activated, output power of, for example, 2 V is output. In response to the output power of 2 V being output, the fifth storage capacitor 303 is charged by the output power, and the voltage of the fifth storage capacitor 303 increases to 1.9 V without falling below 1.5 V. Thus, even in a case where the voltage at the first terminal 161 of the first output circuit 105 falls below 1.6 V, the second switch 302 can continue to be turned on. Note that the sixth storage capacitor 304 is a smoothing capacitor for the second coil 305, and the seventh storage capacitor 311 is a smoothing capacitor for the power supply of the second control circuit 308.

As described above, in response to a predetermined voltage being input to the first terminal 161 of the first output circuit 105, the first output circuit 105 can start the activation and output the output power. The load 106 is driven for a predetermined period of time by the output power of the first output circuit 105 supplied to the first terminal 171 of the load 106 from the second terminal 162 of the first output circuit 105.

As described above, according to the electronic device including the boost circuit of the present embodiment, by activating the first boost circuit 103 a plurality of times and storing power in the second storage capacitor 104, the load 106 can be driven for the predetermined period of time by the power of the power generation element 101 by using the small first storage capacitor 102 and the small second storage capacitor 104, both having a small capacitance value as compared with a conventional storage capacitor.

Second Embodiment

Figure 4:
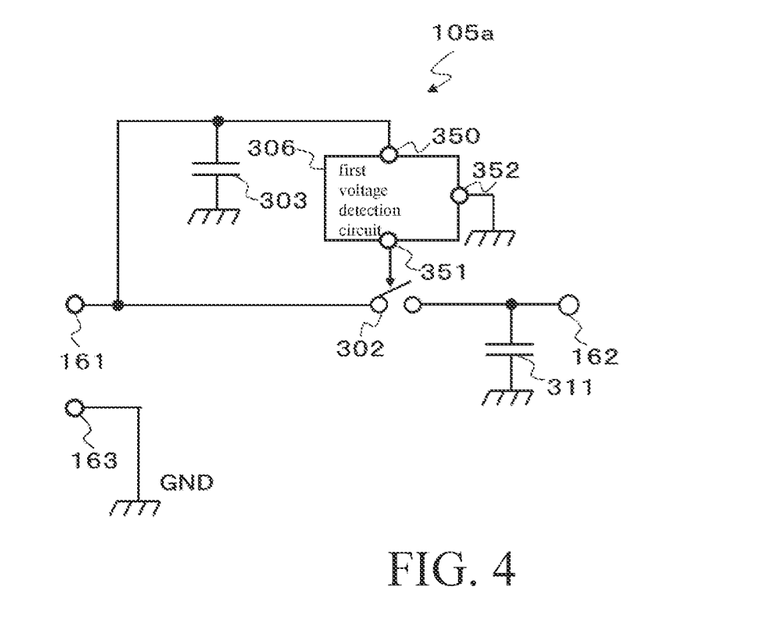
FIG. 4 is a circuit diagram illustrating an example of a second output circuit of a second embodiment of the present invention.

A second embodiment of the present invention will be described below with reference to the drawings. The second embodiment has a configuration in which the first output circuit 105 of the first embodiment is replaced with a second output circuit 105a.

FIG. 4 is a circuit diagram illustrating an example of the second output circuit 105a of the electronic device including the boost circuit according to the present embodiment. The second output circuit 105a includes the first voltage detection circuit 306, the fifth storage capacitor 303, the seventh storage capacitor 311, the second switch 302, the first terminal 161, the second terminal 162, and the third terminal 163.

Connection of the second output circuit 105a will be described. The first terminal 161 of the second output circuit 105a is connected to the first terminal of the fifth storage capacitor 303, the first terminal 350 of the first voltage detection circuit 306, and the first terminal of the second switch 302. The second terminal 351 of the first voltage detection circuit 306 is connected to the control terminal of the second switch 302. The third terminal 352 of the first voltage detection circuit 306 and the second terminal of the fifth storage capacitor 303 are connected to the GND power supply. The second terminal of the second switch 302 is connected to a first terminal of the seventh storage capacitor 311 and the second terminal 162 of the second output circuit 105a. The third terminal 163 of the second output circuit 105a and the second terminal of the seventh storage capacitor 311 are connected to the GND power supply.

Operation of the second output circuit 105a of the electronic device including the boost circuit of the second embodiment will be described.

The second output circuit 105a monitors a voltage of the power input to the first terminal 161 of the second output circuit 105a by the first voltage detection circuit 306. In response to the first voltage detection circuit 306 detecting that the voltage at the first terminal 161 of the second output circuit 105a has reached a predetermined voltage, the first voltage detection circuit 306 turns on the second switch 302. In response to the second switch 302 being turned on, the power input to the first terminal 161 of the second output circuit 105a is output as output power from the second terminal 162 of the second output circuit 105a. The load 106 is driven for a predetermined period of time by the output power of the second output circuit 105a supplied to the first terminal 171 of the load 106. The seventh storage capacitor 311 is a smoothing capacitor for the power supply of the load 106.

For example, in a case where a detection voltage of the first voltage detection circuit 306 is 1.9 V and a detection cancel voltage is 1.6 V, in response to a voltage of 1.9 V being input to the first terminal 161 of the second output circuit 105a, the second output circuit 105a outputs the output power from the second terminal 162 of the second output circuit 105a. In response to the second output circuit 105a outputting the output power, the voltage at the first terminal 161 of the second output circuit 105a starts to decrease, and in response to the voltage at the first terminal 161 of the second output circuit 105a falling below 1.6 V, the second output circuit 105a stops outputting the output power. In response to a predetermined voltage being input to the first terminal 161 of the second output circuit 105a, the second output circuit 105a can start the activation and drive the load 106 for the predetermined period of time.

As described above, according to the electronic device including the boost circuit of the present embodiment, by activating the first boost circuit 103 a plurality of times and storing power in the second storage capacitor 104, the load 106 can be driven for the predetermined period of time by the power of the power generation element 101 by using the small first storage capacitor 102 and the small second storage capacitor 104, both having a small capacitance value as compared with a conventional storage capacitor.

Third Embodiment

Figure 5:
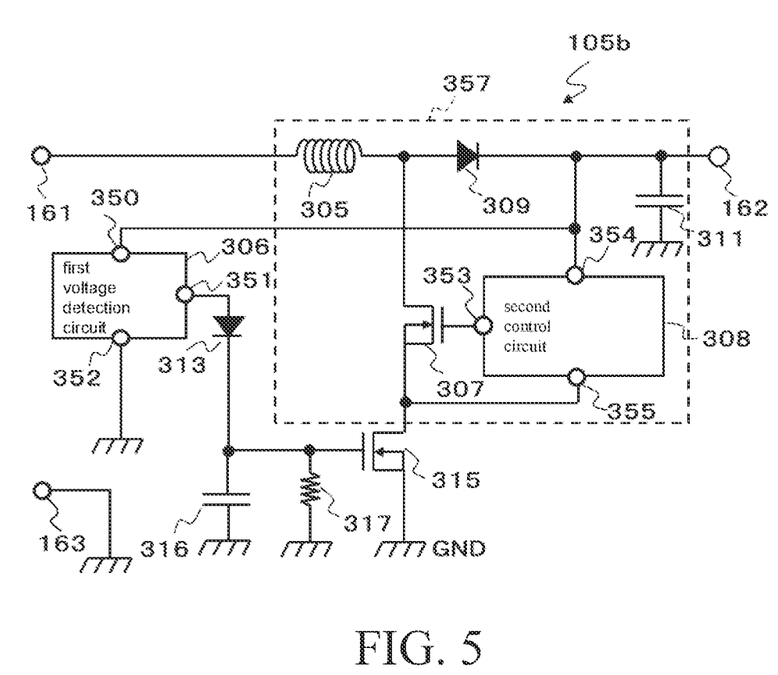
FIG. 5 is a circuit diagram illustrating an example of a third output circuit of a third embodiment of the present invention.

A third embodiment of the present invention will be described below with reference to the drawings. The third embodiment has a configuration in which the first output circuit 105 of the first embodiment is replaced with a third output circuit 105b.

FIG. 5 is a circuit diagram illustrating an example of the third output circuit 105b of the electronic device including the boost circuit according to the present embodiment. The third output circuit 105b includes the first voltage detection circuit 306, the second control circuit 308, the third diode 309, a fifth diode 313, the seventh storage capacitor 311, an eighth storage capacitor 316, the second NMOS transistor 307, a third NMOS transistor 315, a first resistor 317, the second coil 305, the first terminal 161, the second terminal 162, and the third terminal 163. Here, the second control circuit 308, the third diode 309, the seventh storage capacitor 311, the second NMOS transistor 307, and the second coil 305 constitute a fourth boost circuit 357.

Connection of the third output circuit 105b will be described. The first terminal 161 of the third output circuit 105b is connected to the first terminal of the second coil 305. A second terminal of the second coil 305 is connected to an anode terminal of the third diode 309 and a drain terminal of the second NMOS transistor 307. The cathode terminal of the third diode 309 is connected to the first terminal 350 of the first voltage detection circuit 306, the second terminal 354 of the second control circuit 308, the first terminal of the seventh storage capacitor 311, and the second terminal 162 of the third output circuit 105b. The first terminal 353 of the second control circuit 308 is connected to the gate terminal of the second NMOS transistor 307. The third terminal 355 of the second control circuit 308 is connected to the source terminal of the second NMOS transistor 307 and a drain terminal of the third NMOS transistor 315.

The second terminal 351 of the first voltage detection circuit 306 is connected to an anode terminal of the fifth diode 313. The third terminal 352 of the first voltage detection circuit 306 is connected to the GND power supply. A cathode terminal of the fifth diode 313 is connected to a first terminal of the eighth storage capacitor 316, a first terminal of the first resistor 317, and a gate terminal of the third NMOS transistor 315. The third terminal 163 of the third output circuit 105b, a second terminal of the eighth storage capacitor 316, a second terminal of the first resistor 317, and a source terminal of the third NMOS transistor 315 are connected to the GND power supply.

Operation of the third output circuit 105b of the electronic device including the boost circuit of the third embodiment will be described. Power input to the first terminal 161 of the third output circuit 105b is supplied to the second terminal 162 of the third output circuit 105b, the second terminal 354 of the second control circuit 308, and the first terminal 350 of the first voltage detection circuit 306 via the second coil 305 and the third diode 309. The first voltage detection circuit 306 is operated by the power supplied to the first terminal 350 of the first voltage detection circuit 306, and monitors the voltage at the first terminal 350 of the first voltage detection circuit 306. In response to the first voltage detection circuit 306 detecting that the voltage at the first terminal 350 of the first voltage detection circuit 306 has reached a predetermined voltage or greater, the first voltage detection circuit 306 outputs the voltage at the first terminal 350 of the first voltage detection circuit 306 from the second terminal 351 of the first voltage detection circuit 306. The voltage at the first terminal 350 of the first voltage detection circuit 306 output from the second terminal 351 of the first voltage detection circuit 306 is supplied to the gate terminal of the third NMOS transistor 315 via the fifth diode 313, and this turns on the third NMOS transistor 315.

In response to the third NMOS transistor 315 being turned on, the second control circuit 308 of the fourth boost circuit 357 starts operating. The second control circuit 308 repeats turning on and off the second NMOS transistor 307. The power stored in the second coil 305 while the second NMOS transistor 307 is on is output to the second terminal 162 via the third diode 309 while the second NMOS transistor 307 is off, and thus output power of the fourth boost circuit 357 is output from the second terminal 162. The voltage of the output power of the fourth boost circuit 357 is equal to or greater than the detection voltage of the first voltage detection circuit 306. Thus, in response to the output power of the fourth boost circuit 357 being supplied to the first terminal 350 of the first voltage detection circuit 306, the first voltage detection circuit 306 outputs the voltage at the first terminal 350 of the first voltage detection circuit 306 from the second terminal 351 of the first voltage detection circuit 306. Thus, the third NMOS transistor 315 continues to be turned on. Note that the seventh storage capacitor 311 is a smoothing capacitor for the power supply of the second control circuit 308, and the eighth storage capacitor 316 is a capacitor for holding the gate voltage of the third NMOS transistor 315 for a predetermined period of time even in a case where no voltage is output from the second terminal 351 of the first voltage detection circuit 306. Further, the first resistor 317 is a resistor for discharging the seventh storage capacitor 311.

For example, in a case where a detection voltage of the first voltage detection circuit 306 is 1.8 V, a detection cancel voltage is 1.7 V, a capacitance value of the eighth storage capacitor 316 is 1 µF, a resistance value of the first resistor 317 is 1 MΩ, and a voltage of the output power of the fourth boost circuit 357 is 2.0 V, in response to a voltage of 1.9 V being input to the first terminal 161 of the third output circuit 105b, the first voltage detection circuit 306 of the third output circuit 105b outputs the voltage at the first terminal 350 of the first voltage detection circuit 306 from the second terminal 351 of the first voltage detection circuit 306. Thus, the second control circuit 308 starts operating.

In response to the second control circuit 308 starting to operate, since the voltage of the input power falls below 1.8 V, the first voltage detection circuit 306 does not output the voltage at the first terminal 350 of the first voltage detection circuit 306 from the second terminal 351 of the first voltage detection circuit 306. At this time, since the voltage of the third NMOS transistor 315 hardly decreases due to the fifth diode 313 and the eighth storage capacitor 316, the third NMOS transistor 315 can maintain the on state. As a result, the second control circuit 308 can maintain the operation, and output power of 2.0 V is output from the fourth boost circuit 357. In response to output power of 2.0 V being output from the fourth boost circuit 357, the first voltage detection circuit 306 outputs the voltage at the first terminal 350 of the first voltage detection circuit 306 from the second terminal 351 of the first voltage detection circuit 306. Thus, the fourth boost circuit 357 can continue to output the output power from the second terminal 162 of the third output circuit 105b until the voltage of the power input to the first terminal 161 of the third output circuit 105b drops to approximately 0.1 V.

As described above, in response to a predetermined voltage being input to the first terminal 161, the third output circuit 105b can start activation and drive the load 106 for a predetermined period of time.

As described above, according to the electronic device including the boost circuit of the present embodiment, by activating the first boost circuit 103 a plurality of times and storing power in the second storage capacitor 104, the load 106 can be driven for the predetermined period of time using the power of the power generation element by using the small first storage capacitor 102 and the small second storage capacitor 104, both having a small capacitance value as compared with a conventional storage capacitor.

According to the present invention, the first boost circuit can be operated by the stored power of the small first storage capacitor having a small capacitance value and that is charged by the power of the power generation element, and the power of the first storage capacitor can be stored in the second storage capacitor. Since the stored power stored in the second storage capacitor has a higher voltage than that of the stored power stored in the first storage capacitor, the power used for operating the load for the predetermined period of time can be stored by the small second storage capacitor having a small capacitance value. In response to the first boost circuit operating a plurality of times and the power for operating the load for the predetermined period of time being stored in the second storage capacitor, the output circuit outputs the power for operating the load for the predetermined period of time to the load.

Since the second storage capacitor of the present invention stores the power for operating the load for the predetermined period of time at a further higher voltage, a small storage capacitor having a small capacitance value may be used. Further, since the first storage capacitor of the present invention, which is directly connected to the power generation element, operates the first boost circuit a plurality of times (for example, 100 times in the first embodiment) to store predetermined power in the second storage capacitor, a small storage capacitor having a capacitance value smaller than that of an electronic device including a conventional boost circuit may be used.

What is claimed is:

1. An electronic device comprising: an input terminal connected to a power generator that supplies input electricity; a first storage capacitor configured to store the input electricity therein supplied through the input terminal, wherein the first storage capacitor is operable to repeat charge and discharge of the input electricity stored therein; a first boost circuit activated to become operative, from being inactive, to start to elevate the input electricity stored in the first storage capacitor to first elevated electricity when the input electricity stored in the first storage capacitor increases its voltage to a first predetermined voltage during charging the first storage capacitor with the input electricity and deactivated to become inactive when the input electricity stored in the first storage capacitor is discharged through boosting operation of the first boost circuit; a second storage capacitor configured to store the first elevated electricity therein supplied from the first boost circuit, wherein the second storage capacitor is operable to repeat charge and discharge of the first elevated electricity stored therein; a first output circuit activated to become operative, from being inactive, to start to elevate the first elevated electricity stored in the second storage capacitor to second elevated electricity when the first elevated electricity stored in the second storage capacitor increases its voltage to a second predetermined voltage during charging the second storage capacitor with the first elevated electricity and deactivated to become inactive when the first elevated electricity stored in the second storage capacitor is discharged through boosting operation of the first output circuit; and a load connected to the first output circuit to receive the second elevated electricity from the first output circuit.

2. The electronic device according to claim 1, wherein the first elevated electricity stored in the second storage capacitor has a voltage higher than a voltage of the input electricity stored in the first storage capacitor.

3. The electronic device according to claim 2, wherein the first output circuit includes a first voltage detection circuit, a third boost circuit, and a second switch, the second switch is disposed between an input terminal of the first output circuit and the third boost circuit, and a control terminal of the second switch is connected to the first voltage detection circuit.

4. The electronic device according to claim 2, wherein the first output circuit includes a first voltage detection circuit and a second switch, the second switch is disposed between an input terminal and an output terminal of the first output circuit, and a control terminal of the second switch is connected to the first voltage detection circuit.

5. The electronic device according to claim 2, wherein the first output circuit includes a first voltage detection circuit, a fourth boost circuit, and a transistor switch, the transistor switch is disposed between a power supply terminal of the fourth boost circuit and a GND power supply, and a control terminal of the transistor switch is connected to the first voltage detection circuit.

6. The electronic device according to claim 1, wherein the first output circuit includes a first voltage detection circuit, a third boost circuit, and a second switch, the second switch is disposed between an input terminal of the first output circuit and the third boost circuit, and a control terminal of the second switch is connected to the first voltage detection circuit.

7. The electronic device according to claim 1, wherein the first output circuit includes a first voltage detection circuit and a second switch, the second switch is disposed between an input terminal and an output terminal of the first output circuit, and a control terminal of the second switch is connected to the first voltage detection circuit.

8. The electronic device according to claim 1, wherein the first output circuit includes a first voltage detection circuit, a fourth boost circuit, and a transistor switch, the transistor switch is disposed between a power supply terminal of the fourth boost circuit and a GND power supply, and a control terminal of the transistor switch is connected to the first voltage detection circuit.

9. The electronic device according to claim 1, wherein the first boost circuit comprises: a second boost circuit activated to elevate the input electricity stored in the first storage capacitor and output a third elevated electricity; a third storage capacitor configured to store the third elevated electricity therein supplied from the second boost circuit; a first control circuit activated by a stored voltage of the third storage capacitor to become operative, from being inactive, to start to output an on/off signal to inductively elevate the input electricity stored in the first storage capacitor to the first elevated electricity; and a first switch turned on to connect the third storage capacitor to the first control circuit to activate the first control circuit, when the stored voltage of the third storage capacitor increases to a third predetermined voltage during charging the third storage capacitor with the third elevated electricity.

10. The electronic device according to claim 9, wherein the first boost circuit further comprises a fourth storage capacitor configured to smooth power supply to the first control circuit.

11. The electronic device according to claim 1, wherein the first output circuit comprises:
  a third boost circuit activated to elevate the first elevated electricity stored in the second storage capacitor to the second elevated electricity;
  a fifth storage capacitor configured to store the first elevated electricity therein supplied from the second storage capacitor;
  a second switch turned on to connect the second storage capacitor to the third boost circuit to activate the third boost circuit;
  a second control circuit included in the third boost circuit and activated by a stored voltage of the fifth storage capacitor to start to output an on/off signal to inductively elevate the first elevated electricity stored in the second storage capacitor to the second elevated electricity; and
  a first voltage detection circuit configured to monitor the stored voltage of the fifth storage capacitor and turn on the second switch to activate the second control circuit when the stored voltage of the fifth storage capacitor increases to a fourth predetermined voltage during charging the fifth storage capacitor with the first elevated electricity.

12. The electronic device according to claim 11, wherein the first output circuit is configured to supply the second elevated electricity back to the first voltage detection circuit to keep the second switch turned on and back to the second control circuit to keep the second control circuit activated.

13. The electronic device according to claim 11, wherein the third boost circuit further comprises a sixth storage capacitor configured to smooth power supply to the third boost circuit and a seventh storage capacitor configured to smooth power supply to the load.

14. The electronic device according to claim 1, wherein the first output circuit comprises:
  a fifth storage capacitor configured to store the first elevated electricity therein supplied from the second storage capacitor;
  a second switch turned on to connect the second storage capacitor directly to the load to supply the first elevated electricity stored in the second storage capacitor directly to the load; and
  a first voltage detection circuit configured to monitor a stored voltage of the fifth storage capacitor and turn on the second switch when the stored voltage of the fifth storage capacitor increases to a fifth predetermined voltage during charging the fifth storage capacitor with the first elevated electricity.

15. The electronic device according to claim 1, wherein the first output circuit comprises:
  a fourth boost circuit activated to elevate the first elevated electricity stored in the second storage capacitor to the second elevated electricity;
  a second control circuit included in the fourth boost circuit and activated by the second elevated electricity to start to output an on/off signal to inductively elevate the first elevated electricity stored in the second storage capacitor to the second elevated electricity;
  a transistor switch turned on to make operable the on/off signal from the second control circuit to enable elevation of the first elevated electricity to the second elevated electricity and turned off to make inoperative the on/off signal from the second control circuit to disable elevation of the first elevated electricity to the second elevated electricity; and
  a first voltage detection circuit configured to monitor the second elevated electricity and turn on the transistor switch to enable elevation of the first elevated electricity to the second elevated electricity, when the second elevated electricity increases to a fifth predetermined level.

16. The electronic device according to claim 15, wherein the fourth boost circuit further comprises a seventh storage capacitor configured to smooth power supply to the load.

* * * * *